United States Patent
Li

(10) Patent No.: US 9,781,475 B2
(45) Date of Patent: Oct. 3, 2017

(54) INFORMATION PROCESSING METHOD, SYSTEM AND ELECTRONIC DEVICE

(71) Applicants: Beijing Lenovo Software Ltd., Beijing (CN); Lenovo (Beijing) Co., Ltd., Beijing (CN)

(72) Inventor: Fanzhi Li, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 754 days.

(21) Appl. No.: 14/229,862

(22) Filed: Mar. 29, 2014

(65) Prior Publication Data

US 2015/0092046 A1 Apr. 2, 2015

(30) Foreign Application Priority Data

Sep. 27, 2013 (CN) .......................... 2013 1 0452921

(51) Int. Cl.
*H04N 7/18* (2006.01)
*H04N 21/442* (2011.01)
(Continued)

(52) U.S. Cl.
CPC ....... *H04N 21/44218* (2013.01); *G06F 3/011* (2013.01); *G06F 3/012* (2013.01);
(Continued)

(58) Field of Classification Search
CPC ...... G06F 3/014; G06F 17/3087; G06F 3/011; H04N 21/44218
(Continued)

(56) References Cited

U.S. PATENT DOCUMENTS 6,941,239 B2 * 9/2005 Unuma ................ A43B 3/0005
340/8.1
8,224,619 B2 7/2012 Onishi et al.
(Continued)

FOREIGN PATENT DOCUMENTS

CN 101807113 A 8/2010
CN 101890719 A 11/2010
(Continued)

OTHER PUBLICATIONS

First Chinese Office Action regarding Application No. 201310452921.7 dated Feb. 28, 2017. English translation provided by Unitalen Attorneys at Law.

*Primary Examiner* — Gims Philippe
(74) *Attorney, Agent, or Firm* — Harness, Dickey & Pierce, P.L.C.

(57) ABSTRACT

An information processing method, a system and an electronic device are disclosed. The method includes: acquiring a first motion locus with the first electronic component, where the first motion locus is generated by the first part from a first time instant to a second time instant; and acquiring a second motion locus with the second electronic component, where the second motion locus is generated by the second part from the first time instant to the second time instant. The first electronic device may obtain and execute a first control instruction corresponding to the first motion locus and the second motion locus. With the method and electronic device, an advantage of precisely recognizing a slight local action of the user is achieved.

9 Claims, 2 Drawing Sheets

(51) Int. Cl.
H04N 21/4223 (2011.01)
G06F 3/01 (2006.01)
G06F 1/16 (2006.01)

(52) U.S. Cl.
CPC .............. *G06F 3/014* (2013.01); *G06F 3/017* (2013.01); *H04N 21/4223* (2013.01); *G06F 1/1694* (2013.01); *G06F 2203/0331* (2013.01)

(58) Field of Classification Search
USPC ............ 348/135; 715/863; 707/741; 340/8.1
See application file for complete search history.

(56) References Cited

U.S. PATENT DOCUMENTS

| | | |
|---|---|---|
| 9,000,887 B2 | 4/2015 | Linsky et al. |
| 9,024,865 B2 | 5/2015 | Linsky et al. |
| 9,030,404 B2 | 5/2015 | Linsky et al. |
| 2002/0012014 A1* | 1/2002 | Mohri .................... G06F 3/014 715/863 |
| 2002/0036617 A1 | 3/2002 | Pryor |
| 2010/0204953 A1 | 8/2010 | Onishi et al. |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2014/0101169 A1* | 4/2014 | Kurata ................ G06F 17/3087 707/748 |

FOREIGN PATENT DOCUMENTS

| | | |
|---|---|---|
| CN | 102473025 A | 5/2012 |
| CN | 102866789 A | 1/2013 |

\* cited by examiner

INFORMATION PROCESSING METHOD, SYSTEM AND ELECTRONIC DEVICE

CROSS REFERENCES OF RELATED APPLICATION

The present application claims the priority to Chinese Patent Application No. 201310452921.7, entitled "INFORMATION PROCESSING METHOD, SYSTEM AND ELECTRONIC DEVICE", filed on Sep. 27, 2013 with the State Intellectual Property Office of People's Republic of China, which is incorporated herein by reference in its entirety.

FIELD

The present disclosure relates to the field of electronics, and in particular, to an information processing method, a system and an electronic device.

BACKGROUND

Along with rapid development of electronics, people have their life increasingly closely correlated with networks and electronic products having various functions. Various applications enriching and facilitating the life of people have emerged constantly as well. In order to enhance the user experience and the sense of immersion during usage of electronic devices, many electronic devices can recognize a user action such as a gesture, and execute a corresponding instruction in response to the recognized action.

Conventionally, the following two approaches are generally adopted in commercial electronic devices to recognize the user action.

In a first approach, an action video of the user is acquired with a camera, and then the user action is recognized through technologies such as dynamic image processing, etc.

In a second approach, a device including a sensor is arranged, and the user action is recognized by obtaining a motion locus of the device.

However the inventors of the disclosure have identified at least the following disadvantages existing in the above approaches.

In the approach of acquiring the action video of the user with the camera and then recognizing the user action through dynamic image processing, there is a considerable response delay due to heavy calculations of the dynamic image processing, and when the user performs a whole action, it is not easy to recognize a slight action of the user, such as wiggling a finger, etc., thus resulting in poor sensitivity.

In the approach of arranging the device including the sensor to recognize the user action, in the case that the user simultaneously performs a whole action and a local action, the motion locus recognized by the device including the sensor is caused by a combination of the whole action and the local action. Interference arising from the whole action may not be removed, and accordingly, the slight local action may not be extracted, thus resulting in poor ability of anti-interference.

Stated otherwise, conventionally, in the case that the user simultaneously performs the whole action and the local action, the interference arising from the whole action may not be removed, and accordingly, the subtle local action may not be extracted, that is, the ability of anti-interference is poor.

SUMMARY

An information processing method, a system and an electronic device are provided according to embodiments of the disclosure, to solve a conventional disadvantage that in the case that a user simultaneously performs a whole action and a local motion, interference arising from the whole action may not be removed and accordingly a slight local action may not be extracted, that is, the ability of anti-interference is poor.

In one aspect, an information processing method is provided according to an embodiment of the disclosure.

The method is applied to an information acquisition system which may be connected with a first electronic device. The information acquisition system includes a first electronic component fixed at a first part of a user and a second electronic component fixed at a second part of the user. The method includes:

acquiring a first motion locus with the first electronic component, where the first motion locus is generated by the first part from a first time instant to a second time instant; and acquiring a second motion locus with the second electronic component, where the second motion locus is generated by the second part from the first time instant to the second time instant, and when the first part performs a first motion corresponding to the first motion locus, the second part performs a second motion corresponding to the second motion locus;

where the first electronic device obtains and executes a first control instruction corresponding to the first motion locus and the second motion locus.

Optionally, after the process of acquiring the second motion locus with the second electronic component, the method further includes:

obtaining, based on the first motion locus and the second motion locus, a relative motion locus of the first part with respect to the second part from the first time instant to the second time instant;

determining, based on the relative motion locus, a first action of the user from the first time instant to the second time instant;

and generating the first control instruction based on the first action, and sending the first control instruction to the first electronic device to make the first electronic device execute the first control instruction.

Optionally, the process of determining, based on the relative motion locus, the first action of the user from the first time instant to the second time instant includes:

acquiring, through the first electronic component, a first angle of rotation of the first part from the first time instant to the second time instant;

acquiring, through the second electronic component, a second angle of rotation of the second part from the first time instant to the second time instant;

obtaining, based on the first angle of rotation and the second angle of rotation, a relative angle of rotation of the first part with respect to the second part from the first time instant to the second time instant; and determining the first action based on the relative motion locus and the relative angle of rotation.

Optionally, after the process of acquiring, through the second electronic component, the second motion locus of the second part from the first time instant to the second time instant, the method further includes:

sending the first motion locus and the second motion locus to the first electronic device, to make the electronic device obtain, based on the first motion locus and the second motion locus, a relative motion locus of the first part with respect to the second part from the first time instant to the second time instant; determine, based on the relative motion locus, a first action of the user from the first time instant to the second time instant; and generate the first control instruction based on the first action and execute the first control instruction.

Optionally, the process of sending the first motion locus and the second motion locus to the first electronic device includes:

acquiring, through the first electronic component, a first angle of rotation of the first part from the first time instant to the second time instant;

acquiring, through the second electronic component, a second angle of rotation of the second part from the first time instant to the second time instant; and sending the first angle of rotation, the second angle of rotation, the first motion locus and the second motion locus to the first electronic device, to make the first electronic device obtain, based on the first angle of rotation, the second angle of rotation, the first motion locus and the second motion locus, a relative angle of rotation of the first part with respect to the second part from the first time instant to the second time instant, and the relative motion locus of the first part with respect to the second part from the first time instant to the second time instant; and determine, based on the relative angle of rotation and the relative motion locus, the first action of the user from the first time instant to the second time instant.

In another aspect, an information acquisition system which may be connected with a first electronic device is provided according to an embodiment of the disclosure. The system includes:

a first electronic component fixed at a first part and configured to obtain a first motion locus, where the first motion locus is generated by the first part from a first time instant to a second time instant; and a second electronic component fixed at a second part and configured to obtain a second motion locus, where the second motion locus is generated by the second part from the first time instant to the second time instant, and when the first part performs a first motion corresponding to the first motion locus, the second part performs a second motion corresponding to the second motion locus;

where the first electronic device obtains and executes a first control instruction corresponding to the first motion locus and the second motion locus.

Optionally, the system further includes: a processing module configured to, obtain, based on the first motion locus and the second motion locus, a relative motion locus of the first part with respect to the second part from the first time instant to the second time instant; and determine, based on the relative motion locus, a first action of the user from the first time instant to the second time instant; and a first sending module configured to, generate the first control instruction based on the first action, and send the first control instruction to the first electronic device to make the first electronic device execute the first control instruction.

Optionally, the first electronic component is further configured to obtain a first angle of rotation of the first part from the first time instant to the second time instant; the second electronic component is further configured to obtain a second angle of rotation of the second part from the first time instant to the second time instant; and the processing module is further configured to, obtain, based on the first angle of rotation and the second angle of rotation, a relative angle of rotation of the first part with respect to the second part from the first time instant to the second time instant; and determine the first action based on the relative motion locus and the relative angle of rotation.

Optionally, the system further includes: a second sending module configured to send the first motion locus and the second motion locus to the first electronic device, to make the electronic device obtain, based on the first motion locus and the second motion locus, a relative motion locus of the first part with respect to the second part from the first time instant to the second time instant; determine, based on the relative motion locus, a first action of the user from the first time instant to the second time instant; and generate the first control instruction based on the first action, and execute the first control instruction.

Optionally, the first electronic component is further configured to acquire a first angle of rotation of the first part from the first time instant to the second time instant; the second electronic component is further configured to acquire a second angle of rotation of the second part from the first time instant to the second time instant; and the second sending module is further configured to send the first angle of rotation, the second angle of rotation, the first motion locus and the second motion locus to the first electronic device, to make the first electronic device obtain, based on the first angle of rotation, the second angle of rotation, the first motion locus and the second motion locus, a relative angle of rotation of the first part with respect to the second part from the first time instant to the second time instant and the relative motion locus of the first part with respect to the second part from the first time instant to the second time instant; and determine, based on the relative angle of rotation and the relative motion locus, the first action of the user from the first time instant to the second time instant.

In still another aspect, an electronic device which may be connected with the information acquisition system described above is provided according to an embodiment of the disclosure. The electronic device includes:

a receiving module, configured to receive a first angle of rotation, a second angle of rotation, the first motion locus and the second motion locus sent from the information acquisition system;

a calculation module, configured to obtain, based on the first angle of rotation, the second angle of rotation, the first motion locus and the second motion locus, a relative angle of rotation of the first part with respect to the second part from the first time instant to the second time instant and a relative motion locus of the first part with respect to the second part from the first time instant to the second time instant; and determine, based on the relative angle of rotation and the relative motion locus, a first action of the user from the first time instant to the second time instant; and an execution module, configured to generate a control instruction based on the first action and execute the control instruction.

The technical solution according to the embodiments of the disclosure at least has the following advantages.

1. With the method, system and electronic device according to the embodiments of the disclosure, the motion loci of the two parts of the user are acquired by the two electronic components respectively fixed on the two parts, and the electronic device is controlled to execute the first control instruction. In the case that the user simultaneously performs the whole action and the local action, the whole action and the local action may be distinguished from each other with the two electronic components fixed at different parts of the user; therefore, the slight local action of the user is precisely recognized.

2. With the method, system and electronic device according to the embodiments of the disclosure, the electronic device may be controlled based on not only the relative motion locus of the first part with respect to the second part, but also the relative angle of rotation of the first part with respect the second part, that is, both a local movement action of the user and a local rotation action of the user may be recognized; therefore the recognizable first action for generating the first control instruction is diversified.

3. With the method, system and electronic device according to the embodiments of the disclosure, after the first motion locus and the second motion locus are obtained, the information acquisition system may determine the relative motion locus, determine the first motion, and further generate the control instruction. Alternatively, the electronic device may determine the relative motion locus, determine the first motion, and further generate the control instruction, so that the modules for determining the relative motion locus and generating the control instruction may not be integrated in the information acquisition system, and accordingly, the information acquisition system is miniaturized and lightweight.

DETAILED DESCRIPTION OF THE EMBODIMENTS

Figure 1:
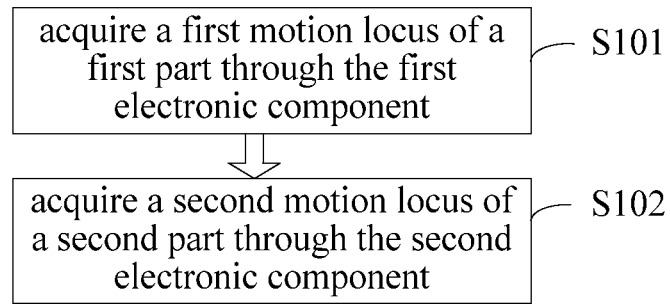
FIG. 1 is a flow chart of an information processing method according to a first embodiment of the disclosure.

An information processing method, a system and an electronic device are provided according to embodiments of the disclosure, to solve a conventional disadvantage that, in the case that a user simultaneously performs a whole action and a local action, interference arising from the whole action may not be removed, and accordingly a slight local action may not be extracted, that is, the ability of anti-interference is poor. An advantage of precisely recognizing the slight local action of the user is achieved.

For solving the disadvantage of poor ability of anti-interference, a technical solution according to the embodiments of the disclosure is as follows.

An information processing method is disclosed. The method is applied to an information acquisition system which may be connected with a first electronic device. The information acquisition system includes a first electronic component fixed at a first part of a user and a second electronic component fixed at a second part of the user. The method includes:

acquiring a first motion locus with the first electronic component, where the first motion locus is generated by the first part from a first time instant to a second time instant; and acquiring a second motion locus with the second electronic component, where the second motion locus is generated by the second part from the first time instant to the second time instant. When the first part performs a first motion corresponding to the first motion locus, the second part performs a second motion corresponding to the second motion locus.

The first electronic device may obtain and execute a first control instruction corresponding to the first motion locus and the second motion locus.

Accordingly, the motion loci of the two parts of the user are acquired by the two electronic components respectively fixed on the two parts, and the electronic device is controlled to execute the first control instruction; thereby solving the disadvantage existing in a technical solution in which only one electronic component including the sensor is arranged to recognize a user action, that in the case that the user simultaneously performs a whole action and a local action, a motion locus recognized by the electronic component including the sensor is caused by a combination of the whole action and the local action, while interference arising from the whole action may not be removed and accordingly a slight local action may not be extracted, that is, the ability of anti-interference is poor. With the technical solution according to the disclosure, an advantage of precisely recognizing the slight local action of the user is achieved.

For getting better understood, the foregoing technical solution is illustrated hereinafter in conjunction with drawings and the embodiments of the disclosure.

A First Embodiment

An information processing method is provided according to the first embodiment. The method is applied to an information acquisition system which may be connected with a first electronic device. The information acquisition system includes a first electronic component fixed at a first part of a user, and a second electronic component fixed at a second part of the user. In practice, the first electronic device may be a cell phone, a laptop, a tablet computer, a desktop or any other electronic device, which is not enumerated according to the disclosure.

Referring to FIG. 1, which is a flow chart of an information processing method according to the first embodiment of the disclosure, the method includes the following steps S101 to S102.

The step S101 is to acquire a first motion locus through the first electronic component. The first motion locus is generated by the first part from a first time instant to a second time instant.

The step S102 is to acquire a second motion locus through the second electronic component. The second motion locus is generated by the second part from the first time instant to the second time instant. When the first part performs a first motion corresponding to the first motion locus, the second part performs a second motion corresponding to the second motion locus.

The first electronic device may obtain and execute a first control instruction corresponding to the first motion locus and the second motion locus.

In practice, the step S101 of acquiring the first motion locus and the step S102 of acquiring the second motion locus may be implemented as follows.

The first electronic device is fixed at the first part of the user, and the second electronic device is fixed at the second part of the user. A device capable of acquiring the motion loci of the electronic components, for example, a gravity sensor is integrated in each of the first electronic component and the second electronic component. In the case that the first electronic component and the second electronic component detect changes in locations of the first part and the second part, the first electronic component and the second electronic component may record motion loci and convert the motion loci into electric signals. Therefore, the first motion locus described in the step S101 and the second motion locus described in the step S102 are generated.

After the first motion locus and the second motion locus are acquired in the step S101 and the step S102, the process of obtaining and executing, by the first electronic device, the first control instruction corresponding to the first motion locus and the second motion locus may be performed in the information acquisition system, or may be performed in the first electronic device. The above two situations are described as follows.

In a first situation, the process of obtaining and executing, by the first electronic device, the first control instruction is performed in the information acquisition system.

After the first motion locus and the second motion locus are acquired, the method further includes:

obtaining, based on the first motion locus and the second motion locus, a relative motion locus of the first part with respect to the second part from the first time instant to the second time instant;

determining, based on the relative motion locus, a first action of the user from the first time instant to the second time instant; and generating, based on the first action, and sending the first control instruction to the first electronic device, so that the first electronic device may execute the first control instruction.

In practice, a relative motion of the first part with respect to the second part is reflected by not only the relative motion locus associated with changes in locations or speeds of the first part and the second part, but also changes in angles arising from rotations of the first part and the second part. For more precisely recognizing the user motion, it is further required to acquire a relative angle of rotation in addition to the relative motion locus, and the first action is determined based on both the relative motion locus and the relative angle of rotation.

Hence, the process of determining the first action of the user from the first time instant to the second time instant further includes:

acquiring, through the first electronic component, a first angle of rotation of the first part from the first time instant to the second time instant;

acquiring, through the second electronic component, a second angle of rotation of the second part from the first time instant to the second time instant;

obtaining, based on the first angle of rotation and the second angle of rotation, a relative angle of rotation of the first part with respect to the second part from the first time instant to the second time instant; and determining the first action based on the relative motion locus and the relative angle of rotation.

In practice, acquisition of the first angle of rotation and the second angle of rotation is similar to the acquisition of the first motion locus and the second motion locus. The first electronic component is fixed at the first part of the user and the second electronic component is fixed at the second part of the user. A device capable of sensing angles of rotation of the electronic components, for example, a gyro is integrated in each of the first electronic component and the second electronic component. In the case that the first electronic component and the second electronic component rotate, the gyros therein may record the angles of rotation and convert the angles of rotation into electric signals to obtain the first angle of rotation and the second angle of rotation.

Since the first action is determined based on both the relative motion locus and the relative angle of rotation of the first part with respect to the second part, the recognizable first action, which is utilized to generate the first control instruction for controlling the first electronic device, is diversified.

In a second situation, the process of obtaining and executing, by the first electronic device, the first control instruction is performed in the first electronic device.

After the first motion locus and the second motion locus are acquired, the method further includes:
sending the first motion locus and the second motion locus to the first electronic device so that the electronic device may obtain, based on the first motion locus and the second motion locus, a relative motion locus of the first part with respect to the second part from the first time instant to the second time instant; determine, based on the relative motion locus, a first action of the user from the first time instant to the second time instant; and generate, based on the first action, and execute the first control instruction.

Again, in view of that a user motion is reflected by not only the motion locus associated with changes in locations and speeds, but also changes in angles arising from rotations, for more precisely recognizing the user motion, it is further required to acquire a relative angle of rotation in addition to the relative motion locus, and the first action is determined based on both the relative motion locus and the relative angle of rotation.

The process of determining the first action of the user from the first time instant to the second time instant further includes:

acquiring, through the first electronic component, a first angle of rotation of the first part from the first time instant to the second time instant;

acquiring, through the second electronic component, a second angle of rotation of the second part from the first time instant to the second time instant; and sending the first angle of rotation, the second angle of rotation, the first motion locus and the second motion locus to the first electronic device, so that the first electronic device may obtain, based on the first angle of rotation, the second angle of rotation, the first motion locus and the second motion locus, the relative angle of rotation of the first part with respect to the second part from the first time instant to the second time instant, and the relative motion locus of the first part with respect to the second part from the first time instant to the second time instant; and determine, based on the relative angle of rotation and the relative motion locus, the first action of the user from the first time instant to the second time instant.

After the first motion locus and the second motion locus are acquired, the electronic device obtains the relative motion locus, determines the first action, and further generates the control instruction. Therefore, modules for obtaining the relative motion locus and for generating the control instruction may not be integrated in the information acquisition system. Accordingly, the information acquisition system is miniaturized and lightweight.

In practice, the first electronic component and the second electronic component may be provided with various matching forms based on demands of the user to acquire various local actions. Two series of matching forms for the first electronic component and the second electronic component are given as follows.

A first series of matching forms is a ring and a bracelet. In the case that a slight action of a finger of the user needs to be acquired, the first electronic component may be provided with the form of the ring, and the second electronic component may be provided with the form of the bracelet. The ring is worn on an index finger performing a gesture and the bracelet is worn on the wrist of a same hand. In the case that the index finger of the user strikes down, a relative motion locus and a relative angle of rotation of the index finger with respect to the wrist may be obtained with the ring and the bracelet, and accordingly, the gesture made by the index finger is precisely recognized.

A second series of matching forms is glasses and a necklace. In the case that a slight action of the head of the user needs to be acquired, the first electronic component may be provided with the form of the glasses, and the second electronic component may be provided with the form of the necklace. The glasses are worn on the head and the necklace is worn on the chest. In the case that the user shakes the head, a relative motion locus and a relative angle of rotation of the head with respect to the chest may be acquired with the glasses and the necklace, and accordingly, the action of the head is precisely recognized without being influenced by a whole action of the user.

Obviously, in practice, the first electronic component and the second electronic component may be provided with various forms and may be worn on various parts of the user, which are not enumerated according to the embodiment.

A Second Embodiment

An information acquisition system is provided according to the second embodiment. The system may be connected with a first electronic device. In practice, the electronic device may be a cell phone, a laptop, a tablet computer, a desktop or any other electronic device, which is not enumerated according to the embodiment.

Figure 2:
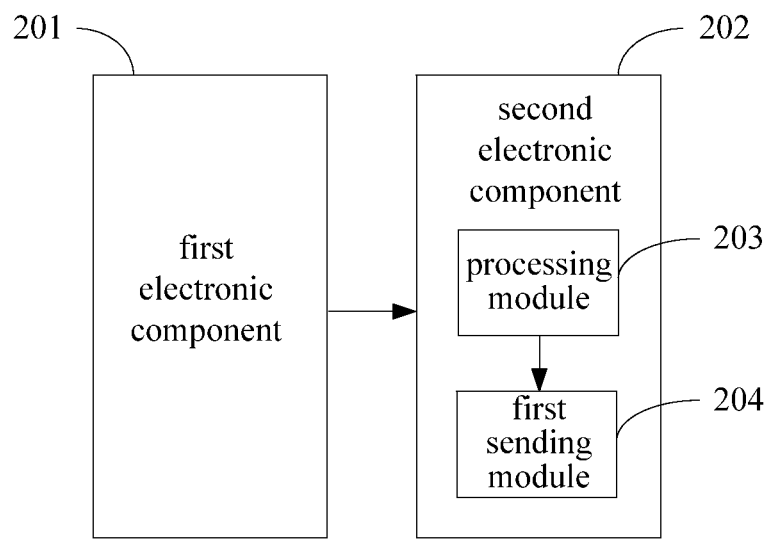
FIG. 2 is a first structural diagram of an information acquisition system according to a second embodiment of the disclosure.
Figure 3:
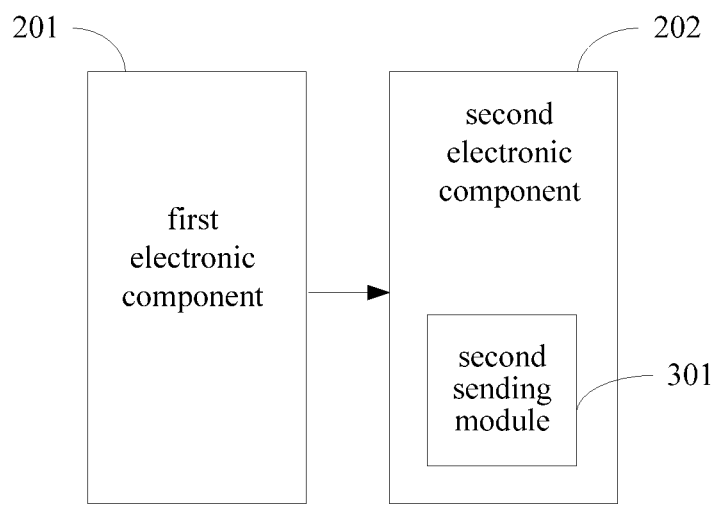
FIG. 3 is a second structural diagram of the information acquisition system according to the second embodiment of the disclosure.

FIG. 2 is a first structural diagram of the information acquisition system according to the second embodiment of the disclosure, and FIG. 3 is a second structural diagram of the information acquisition system according to the second embodiment of the disclosure. As shown in FIG. 2 and FIG. 3, the system includes:

a first electronic component 201, which is fixed at a first part and is configured to obtain a first motion locus, where the first motion locus is generated by the first part from a first time instant to a second time instant; and a second electronic component 202, which is fixed at a second part and is configured to obtain a second motion locus, where the second motion locus is generated by the second part from the first time instant to the second time instant, and when the first part performs a first motion corresponding to the first motion locus, the second part performs a second motion corresponding to the second motion locus.

The first electronic device may obtain and execute a first control instruction corresponding to the first motion locus and the second motion locus.

In practice, as described according to the first embodiment, the process of determining the first action and generating the first control instruction may be performed in the information acquisition system, or may be performed in the first electronic device. Correspondingly, two structures of the information acquisition system are given as follows.

A first structure of the information acquisition system corresponds to a situation that the process of determining the first action and generating the first control instruction is performed in the information acquisition system.

Referring to FIG. 2, the system further includes:

a processing module 203 configured to, obtain, based on the first motion locus and the second motion locus, a relative motion locus of the first part with respect to the second part from the first time instant to the second time instant; and determine, based on the relative motion locus, a first action of the user the first time instant to the second time instant; and a first sending module 204, configured to generate, based on the first action, and send the first control instruction to the first electronic device, so that the first electronic device may execute the first control instruction.

According to the embodiment of the disclosure, the first electronic component 201 is further configured to acquire a first angle of rotation of the first part from the first time instant to the second time instant;

the second electronic component 202 is further configured to acquire a second angle of rotation of the second part from the first time instant to the second time instant; and the processing module 203 is further configured to, obtain, based on the first angle of rotation and the second angle of rotation, a relative angle of rotation of the first part with respect to the second part from the first time instant to the second time instant; and determine the first action based on the relative motion locus and the relative angle of rotation.

A second structure of the information acquisition system corresponds to a situation that the process of determining the first action and generating the first control instruction is performed in the first electronic device.

Referring to FIG. 3, the system further includes a second sending module 301 configured to send the first motion locus and the second motion locus to the first electronic device, so that the electronic device may obtain, based on the first motion locus and the second motion locus, a relative motion locus of the first part with respect to the second part from the first time instant to the second time instant; determine, based on the relative motion locus, a first action of the user from the first time instant to the second time instant; and generate, based on the first action, and execute the first control instruction.

According to the embodiment of the disclosure, the first electronic component 201 is further configured to acquire a first angle of rotation of the first part from first time instant to the second time instant;

the second electronic component 202 is further configured to acquire a second angle of rotation of the second part from the first time instant to the second time instant; and the second sending module 301 is further configured to send the first angle of rotation, the second angle of rotation, the first motion locus and the second motion locus to the first electronic device, so that the first electronic device may obtain, based on the first angle of rotation, the second angle of rotation, the first motion locus and the second motion locus, the relative angle of rotation of the first part with respect to the second part from the first time instant to the second time instant and the relative motion locus of the first part with respect to the second part from the first time instant to the second time instant; and determine, based on the relative angle of rotation and the relative motion locus, the first action of the user from the first time instant to the second time instant.

The information acquisition system according to the embodiment and the information processing method according to the first embodiment are two aspects of a same conception. Since the method embodiment is described in detail, those skilled in the art may clearly acquire, with the foregoing description, the structure and implementations of the electronic device according to the embodiment. The description of the information acquisition system is not further given here for conciseness of the specification.

A Third Embodiment

An electronic device, which is connected with the information acquisition system according to the second embodiment, is provided according to the third embodiment. In practice, the electronic device may be a cell phone, a laptop, a tablet computer, a desktop or any other electronic device, which is not enumerated according to the embodiment.

Figure 4:
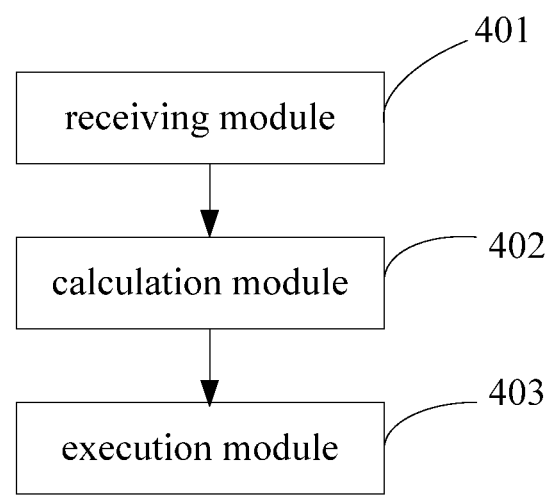
FIG. 4 is a structural diagram of an electronic device according to a third embodiment of the disclosure.

FIG. 4 is a structural diagram of the electronic device according to the third embodiment of the disclosure. As shown in FIG. 4, the electronic device includes:

a receiving module 401, configured to receive a first angle of rotation, a second angle of rotation, a first motion locus and a second motion locus sent from the information acquisition system;

a calculation module 402, configured to obtain, based on the first angle of rotation, the second angle of rotation, the first motion locus and the second motion locus, a relative angle of rotation of the first part with respect to the second part from the first time instant to the second time instant, and a relative motion locus of the first part with respect to the second part from the first time instant to the second time instant; and determine, based on the relative angle of rotation and the relative motion locus, a first action of the user from the first time instant to the second time instant; and an execution module 403, configured to generate, based upon the first action, a control instruction and execute the control instruction.

The technical solution according to the embodiments of the disclosure at least has the following advantages.

1. With the method, system and electronic device according to the embodiments of the disclosure, the motion loci of the two parts of the user are acquired by the two electronic components respectively fixed on the two parts, and the electronic device is controlled to execute the first control instruction. In the case that the user simultaneously performs the whole action and the local action, the whole action and the local action may be distinguished from each other with the two electronic components fixed at different parts of the user; therefore, the slight local action of the user is precisely recognized.

2. With the method, system and electronic device according to the embodiments of the disclosure, the electronic device may be controlled based on not only the relative motion locus of the first part with respect to the second part, but also the relative angle of rotation of the first part with respect the second part, that is, both a local movement action of the user and a local rotation action of the user may be recognized; therefore the recognizable first action for generating the first control instruction is diversified.

3. With the method, system and electronic device according to the embodiments of the disclosure, after the first motion locus and the second motion locus are obtained, the information acquisition system may obtain the relative motion locus, determine the first action, and further generate the control instruction. Alternatively, the electronic device may obtain the relative motion locus, determine the first action, and further generate the control instruction, so that the modules for determining the relative motion locus and generating the control instruction may not be integrated in the information acquisition system, and accordingly, the information acquisition system is miniaturized and lightweight.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be embodied as computer program products implemented on one or multiple computer readable media (including but not limited to magnetic disk storage, CD-ROM, optical storage, etc.) including computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to generate a machine, in which device(s) to implement functions specified in one or more processes of the flowchart and/or one or more blocks of the block diagram are implemented through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable device.

Evidently those skilled in the art may make various modifications and variations to the disclosure without departing from the spirit and scope of the disclosure. Thus the disclosure is also intended to encompass these modifications and variations falling within the scope of the claims of the disclosure and equivalent technologies.

The invention claimed is:

1. An information processing method applied to an information acquisition system connected with a first electronic device, wherein the information acquisition system comprises a first electronic component disposed at a first part of a user and a second electronic component disposed at a second part of the user, the method comprising:

acquiring a first motion locus through the first electronic component, wherein the first motion locus is generated by the first part from a first time instant to a second time instant;

acquiring a second motion locus through the second electronic component, wherein the second motion locus is generated by the second part from the first time instant to the second time instant, and the first part performs a first motion corresponding to the first motion locus while the second part performs a second motion corresponding to the second motion locus;

obtaining a relative motion locus of the first part with respect to the second part from the first time instant to the second time instant, based on the first motion locus and the second motion locus;

determining, based on the relative motion locus, a first action of the user from the first time to the second time instant; and generating a first control instruction based on the first action, and sending the first control instruction to the first electronic device to make the first electronic device execute the first control instruction, wherein the first electronic device obtains and executes a first control instruction corresponding to the first motion locus and the second motion locus.

2. The method according to claim 1, wherein the process of determining, based on the relative motion locus, the first action of the user from the first time instant to the second time instant comprises:

acquiring, through the first electronic component, a first angle of rotation of the first part from the first time instant to the second time instant;

acquiring, through the second electronic component, a second angle of rotation of the second part from the first time instant to the second time instant;

obtaining a relative angle of rotation of the first part with respect to the second part from the first time instant to the second time instant, based on the first angle of rotation and the second angle of rotation; and determining the first action based on the relative motion locus and the relative angle of rotation.

3. The method according to claim 1, wherein after the process of acquiring, through the second electronic component, the second motion locus of the second part from the first time instant to the second time instant, the method further comprises:

sending the first motion locus and the second motion locus to the first electronic device, to make the electronic device obtain, based on the first motion locus and the second motion locus, a relative motion locus of the first part with respect to the second part from the first time instant to the second time instant; determine, based on the relative motion locus, a first action of the user from the first time instant to the second time instant; and generate the first control instruction based on the first action and execute the first control instruction.

4. The method according to claim 3, wherein the process of sending the first motion locus and the second motion locus to the first electronic device comprises:

acquiring, through the first electronic component, a first angle of rotation of the first part from the first time instant to the second time instant;

acquiring, through the second electronic component, a second angle of rotation of the second part from the first time instant to the second time instant; and sending the first angle of rotation, the second angle of rotation, the first motion locus and the second motion locus to the first electronic device, to make the first electronic device obtain, based on the first angle of rotation, the second angle of rotation, the first motion locus and the second motion locus, a relative angle of rotation of the first part with respect to the second part from the first time instant to the second time instant, and the relative motion locus of the first part with respect to the second part from the first time instant to the second time instant; and determine, based on the relative angle of rotation and the relative motion locus, the first action of the user from the first time instant to the second time instant.

5. An information acquisition system connected with a first electronic device, comprising:

a first electronic component disposed at a first part and configured to obtain a first motion locus, wherein the first motion locus is generated by the first part from a first time instant to a second time instant;

a second electronic component disposed at a second part and configured to obtain a second motion locus, wherein the second motion locus is generated by the second part from the first time instant to the second time instant, and the first part performs a first motion corresponding to the first motion locus while the second part performs a second motion corresponding to the second motion locus;

a processor and a memory storing program codes, wherein the processor executes the stored program codes to:

obtain a relative motion locus of the first part with respect to the second part from the first time instant to the second time instant, based on the first motion locus and the second motion locus;

determine, based on relative motion locus, a first action of the user from the first time instant to the second time instant; and generate a first control instruction based on the first action, and send the first control instruction to the first electronic device to make the first electronic device execute the first control instruction, wherein the first electronic device obtains and executes a first control instruction corresponding to the first motion locus and the second motion locus.

6. The system according to claim 5, wherein:

the first electronic component is further configured to obtain a first angle of rotation of the first part from the first time instant to the second time instant;

the second electronic component is further configured to obtain a second angle of rotation of the second part from the first time instant to the second time instant; and the processor further executes the stored program codes to obtain a relative angle of rotation of the first part with respect to the second part from the first time instant to the second time instant, based on the first angle of rotation and the second angle of rotation; and determine the first action based on the relative motion locus and the relative angle of rotation.

7. The system according to claim 5, wherein the processor further executes the stored programs codes to:

send the first motion locus and the second motion locus to the first electronic device, to make the electronic device obtain, based on the first motion locus and the second motion locus, a relative motion locus of the first part with respect to the second part from the first time instant to the second time instant; determine, based on the relative motion locus, a first action of the user from the first time instant to the second time instant; and generate the first control instruction based on the first action, and execute the first control instruction.

8. The system according to claim 7, wherein:

the first electronic component is further configured to acquire a first angle of rotation of the first part from the first time instant to the second time instant;

the second electronic component is further configured to acquire a second angle of rotation of the second part from the first time instant to the second time instant; and the processor further executes the stored program codes to send the first angle of rotation, the second angle of rotation, the first motion locus and the second motion locus to the first electronic device, to make the first electronic device obtain, based on the first angle of rotation, the second angle of rotation, the first motion locus and the second motion locus, a relative angle of rotation of the first part with respect to the second part from the first time instant to the second time instant and the relative motion locus of the first part with respect to the second part from the first time instant to the second time instant; and determine, based on the relative angle of rotation and the relative motion locus, the first action of the user from the first time instant to the second time instant.

9. An electronic device connected with an information acquisition system, wherein the information acquisition system is connected with a first electronic device, and the information acquisition system comprises:

a first electronic component deposed at a first part and configured to obtain a first motion locus, wherein the first motion locus is generated by the first part from a first time instant to a second time instant; and a second electronic component disposed at a second part and configured to obtain a second motion locus, wherein the second motion locus is generated by the second part from the first time instant to the second time instant, and the first part performs a first motion corresponding to the first motion locus while the second part performs a second motion corresponding to the second motion locus;

wherein the first electronic device obtains and executes a first control instruction corresponding to the first motion locus and the second motion locus;

wherein the electronic device comprises a processor and a memory that stores program codes, wherein the processor executes the stored program codes to:

receive a first angle of rotation, a second angle of rotation, the first motion locus and the second motion locus sent from the information acquisition system;

obtain, based on the first angle of rotation, the second angle of rotation, the first motion locus and the second motion locus, a relative angle of rotation of the first part with respect to the second part from the first time instant to the second time instant and a relative motion locus of the first part with respect to the second part from the first time instant to the second time instant; and determine, based on the relative angle of rotation and the relative motion locus, a first action of the user from the first time instant to the second time instant; and generate a control instruction based on the first action and execute the control instruction.

\* \* \* \* \*